2,912,366

PROCESS FOR THE PURIFICATION OF ORGANIC SOLVENTS

Otto S. Kauder, Jamaica, N.Y., assignor to Argus Chemical Corporation

No Drawing. Application January 9, 1958
Serial No. 707,862

9 Claims. (Cl. 202—57)

The present invention relates to purification of solvents, more particularly to the removal of water and peroxides from organic solvents forming the same.

It is well known that organic solvents, especially those containing ether groups, form peroxides when they are allowed to remain in contact with air for a certain period of time. The presence of peroxides in organic solvents represents a serious safety problem; it is, therefore, necessary to remove them from the solvents.

One method of removing the peroxides from the solvents is chemical decomposition by means of reducing agents, such as ferrous salts or sodium bisulfite. The reducing agents are applied in aqueous solutions, in order to be most effective. Since in most cases the purified solvents have to be water-free, it is necessary to dry the solvents in a subsequent operation.

Another way to eliminate the peroxides consists of subjecting the contaminated solvents to a fractional distillation. In this operation, the peroxides, which are the higher boiling components, will accumulate in the distillation residue. In order to keep the peroxide-laden residue from becoming hazardous, the distillation is performed in the presence of a high-boiling liquid which is miscible with the organic solvent, e.g. mineral oil, which dilutes the distillation residue. However, this kind of purification does not effect complete removal of the peroxides, unless performed repeatedly. It is another drawback that water, which may have been taken up by the solvents during their use, is not sufficiently eliminated by fractional distillation.

It is the object of the present invention to overcome the above-mentioned inconveniences and to provide a method which permits the elimination of peroxides and of water from organic solvents by a single operation in an economical manner.

This object is achieved by treating the solvents, at elevated temperatures, with a neutral ester of phosphorous acid of the formula

in which $R_1$, $R_2$, and $R_3$ represent hydrocarbon radicals having a carbon content of $C_6$–$C_{15}$, in which $R_1$ is derived from an aromatic hydrocarbon, and $R_2$, $R_3$ are aliphatic or aromatic hydrocarbon radicals. The phosphite ester may be used by itself or diluted with a high-boiling hydrocarbon miscible with the phosphite.

It is known that triesters of phosphorous acid are oxidized by peroxides and decomposed by water. Fast reaction with water occurs, particularly when the phosphite esters contain at least one aryl group. Consequently, the esters have to be tri-aryl or alkyl-aryl phosphites. The phosphites to be used according to the invention must also have a sufficiently high boiling point of at least 200° C. at normal pressure.

Examples of solvents to be purified by the process according to the invention are: Diethylether, di-isopropyl ether, tetrahydrofurane, dioxane, 1,2-dimethoxy- and 1,2-diethoxy ethane.

Examples of phosphites to be used in the purification are triphenyl-, tricresyl-, trixylenyl-, trioctylphenyl- and nonyl-dicresyl-phosphites.

When we use diluents, as mentioned above, we take for instance Mobilsol L (high-boiling petroleum hydrocarbon) or HB 40 (a partially hydrogenated terphenyl).

The general procedure is first to reflux the solvent, either with the phosphite alone, or with a mixture of phosphite and high-boiling hydrocarbon for about 15–45 minutes, and to distill off purified solvent subsequently. The reflux temperature has to be about 15–50° C. above the boiling temperature of the solvent to be purified. When phosphite alone is being used, we must work with a comparatively large quantity of the same, approximately 50–200% of the weight of the solvent, in order to obtain the required boiling temperature. The phosphite distillation residue may be re-used in following operations.

When a mixture of phosphite and hydrocarbon is used in the purification, we use hydrocarbon in about the same quantity as the solvent and add to it approximately 10–30% of phosphite calculated on the weight of the solvent.

It is possible to run the purification as a continuous operation. The impure solvent is continuously introduced into the phosphite, with or without high-boiling hydrocarbon, kept at a temperature of about 15–50° C. above the boiling point of the solvent, so that peroxide and water are removed rapidly and the purified solvent is distilled out of the reaction zone.

The invention will now be more fully described in a number of examples, but it should be understood that these are given by way of illustration and not of limitation and that many changes in the details can be made without departing from the spirit of the invention.

EXAMPLE 1

*Purification of dioxane (DO)*

The DO showed a positive test for peroxide (pronounced yellow color with acidified potassium iodide).

200 grams DO were added to 200 grams tricresylphosphite, the mixture was refluxed for 15 min., at a reflux temperature of about 140° C.; subsequently, DO distilled off. To the distillation residue, 200 g. untreated DO were added, and the operation was repeated. Then, another 200 grams DO plus 2 grams $H_2O$ were added to the distillation residue, and the operation was again repeated.

All three distillates show a negative peroxide test. To the third distillate, sodium metal was added and no reaction occurred. This proves that the distilled solvent is water free.

EXAMPLE 2

*Purification of tetrahydrofurane (THF)*

Starting material gives positive peroxide test.

200 grams THF, 30 grams triphenyl phosphite, and 200 Mobilsol L mixed, are refluxed for 30 minutes, reflux temperature about 85° C., subsequently THF is distilled off. 200 grams untreated THF are added to the distillation residue and the operation is repeated. Once more, 200 grams untreated THF are added to the residue and treated as before. All three distillates give a negative peroxide test.

EXAMPLE 3

*Purification of diethylether (DE)*

Starting material gives positive peroxide test.

200 grams DE, 200 grams octyldiphenylphosphite and 100 grams HB 40 are refluxed for half an hour. Reflux temperature about 62° C. DE is distilled off. 200 grams untreated DE plus 4 grams H₂O were added to the distillation residue and treatment was repeated. The distilled DE is free from peroxide and H₂O.

What I claim is:

1. A process for the purification of organic solvents by eliminating therefrom peroxides and water contained in said solvents, which comprises admixing to said solvents a neutral ester of phosphorous acid of the formula

in which $R_1$, $R_2$, and $R_3$ represent hydrocarbon radicals having a carbon content of $C_6$–$C_{15}$, in which $R_1$ is derived from an aromatic hydrocarbon, and $R_2$, $R_3$ are hydrocarbon radicals selected from the group consisting of aliphatic and aromatic hydrocarbon radicals, said ester being added in an amount of 50 to 200 percent calculated on the weight of said organic solvent, refluxing the mixture at a temperature which is at least 15° C. above the boiling temperature of said solvent, and distilling off the solvent.

2. The process according to claim 1, wherein the organic solvent to be purified is diethyl ether.

3. The process according to claim 1, wherein the organic solvent to be purified is tetrahydrofurane.

4. The process according to claim 1, wherein the solvent to be purified is dioxane.

5. The process according to claim 1, wherein the phosphorous acid ester to be used is triphenyl phosphite.

6. The process according to claim 1, wherein the phosphorous acid ester to be used is octyldiphenylphosphite.

7. The process according to claim 1, wherein new solvent to be purified is added to the distillation residue, and the operation is repeated.

8. A process for the purification of organic solvents by eliminating therefrom peroxides and water contained in said solvents, which comprises admixing to said solvents a mixture of a neutral ester of phosphorous acid of the formula

in which $R_1$, $R_2$ and $R_3$ represent hydrocarbon radicals having a carbon content of $C_6$–$C_{15}$, in which $R_1$ is derived from an aromatic hydrocarbon, and $R_2$, $R_3$ are hydrocarbon radicals selected from the group consisting of aliphatic and aromatic hydrocarbon radicals, said ester being added in an amount of at least 10% calculated on the weight of said organic solvent, and a high boiling hydrocarbon miscible with said phosphorous acid ester, in an amount approximately equal to the organic solvent, refluxing the mixture at a temperature which is at least 15° C. above the boiling temperature of said solvent, and distilling off the solvent.

9. The process according to claim 8, wherein new solvent to be purified is added to the distillation residue and the operation is repeated.

References Cited in the file of this patent

UNITED STATES PATENTS

| | | |
|---|---|---|
| 2,537,516 | Dawsey et al. | Jan. 9, 1951 |
| 2,537,655 | Dawsey et al. | Jan. 9, 1951 |
| 2,818,372 | Hood et al. | Dec. 31, 1957 |